United States Patent Office 3,460,017
Patented Aug. 5, 1969

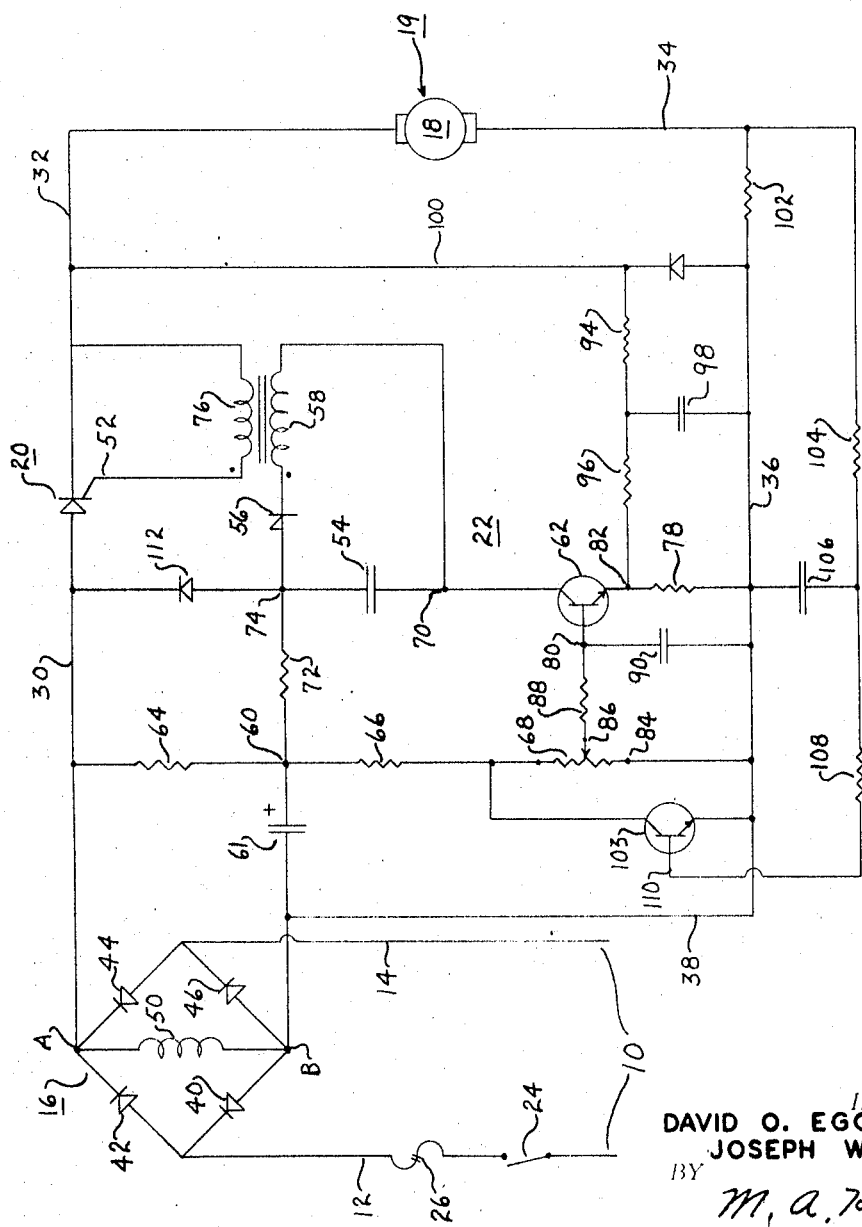

3,460,017
SOLID STATE TRIGGER FOR SCR
David O. Eggleston and Joseph Woyton, Mishawaka, Ind., assignors to The Reliance Electric and Engineering Company, a corporation of Ohio
Filed Jan. 16, 1967, Ser. No. 609,367
Int. Cl. H02p 5/12, 7/24, 7/58
U.S. Cl. 318—345    10 Claims

ABSTRACT OF THE DISCLOSURE

A solid state trigger circuit for a D.C. motor control circuit having a silicon controller rectifier, in which a capacitor, a breakdown diode and a pulse transformer are connected in series to the control element of the rectifier and in which a variable signal is used to control the charge across the capacitor and thereby to control the speed of the motor.

---

In recent years silicon controlled rectifiers have become extensively used in D.C. motor power sources in conjunction with a full wave bridge which converts a primary A.C. power source to a pulsating D.C. current. The silicon controlled rectifier, which is essentially a switching device, controls the D.C. current to the motor normally in response to a variable signal representing load on the motor or desired speed as determined by a pre-set or manually operated control, the silicon controlled rectifier being controlled by a trigger circuit which causes the rectifier to fire intermittently in accordance with the signal, and thereby supply the required current to the motor to satisfy load and/or speed requirements. In the past, particularly in installations requiring maximum reliability, the trigger circuit has primarily been of the magnetic amplifier types; however, this type of trigger has a number of inherent disadvantages, such as, for example, excess weight, bulk and cost which render that type of trigger circuit unsatisfactory or undesirable for many installations and uses. It is therefore one of the principal objects of the present invention to provide a relatively simple, highly reliable solid state trigger for a silicon controlled rectifier, which is relatively light in weight and adaptable to miniaturization, and which is versatile and capable of being used in a large variety of different types of installations.

Another object of the invention is to provide a silicon controlled rectifier trigger which can be constructed with relatively fed, inexpensive components and elements, can be readily assembled into a sturdy and durable unit or module, and which can be easily tested and serviced in the field.

Further objects and advantages of the invention will become apparent from the following description and accompanying drawing, wherein the figure is a schematic diagram of a circuit for a D.C. motor having a silicon controlled rectifier therein controlled by the present solid state trigger.

Referring more specifically to the drawing, numeral 10 designates a source of A.C. current having primary lines 12 and 14, 16 a full-wave rectifier bridge, 18 an armature of a D.C. motor 19 controlled and operated by the present silicon controlled rectifier and trigger system generally indicated by the numerals 20 and 22, respectively. A primary switch 24 and fuse 26 are included in line 12 and are conventional components. The drawing illustrates a practical circuitry embodying the present invention, and it should be understood that variations in the circuitry and the inclusion of additional circuits to perform other functions may be made without departing from the concept of the present invention.

The full wave rectifier bridge 16 converts the A.C. power of lines 12 and 14 to D.C. pulsating power supplied to motor 19 through line 30, silicon controlled rectifier 20, and line 32, and from the motor to the bridge through lines 34, 36 and 38. The bridge 16, which may be considered, for the purpose of the present invention, a conventional bridge, consists of rectifiers 40, 42, 44 and 46 interconnecting lines 12 and 14 with lines 30 and 38. On the first half of an A.C. cycle, when line 12 is positive and line 14 is negative, current will flow through diode 42 to point A, producing a positive potential at the point and a corresponding negative voltage at point B. On the next half cycle, when line 14 is positive, current will flow through diode 44 and will produce the positive voltage at point A once again and point B will be negative. Diodes 40 and 46 acts as D.C. return circuits. A positive pulsating D.C. voltage will be present at point A, and its frequency of pulsation will be twice as great as that of the A.C. voltage being fed into input lines 12 and 14. For example, for a 60-Hertz input, the output from the rectifier bridge would be 120-Hertz pulsating D.C., i.e. i.e the voltage at point A will rise from zero to its maximum poseitive voltage and fall back to zero every $\frac{1}{120}$ second. Between points A and B is connected the field winding 50 of D.C. motor 19, giving the motor a constant field excitation. This allows the motor speed to be controlled simply by varying the current flowing to the armature winding 18 of the motor.

The basic control of the armature is accomplished by the use of two basic functional blocks, designated generally as silicon controlled rectifier 20 and its control circuitry 22.

At the beginning of a half cycle of the A.C. input, i.e. at the beginning of a D.C. cycle, the voltage at point A and therefore at the anode of the silicon controlled rectifier 20 is zero, and the SCR does not conduct. As the D.C. cycle progresses, the SCR will continue to remain in a state of non-conduction until the control element 52 of the SCR receives a voltage pulse from control circuitry 22, and it will continue to conduct until the end of the cycle, when the voltage at the anode again goes to zero. Armature 18, which receives its operating voltage through SCR 20, receives a current for only part of the D.C. cycle. Since the speed of the motor is determined by the amount of current flowing through the armature, and since a longer conduction time of the SCR allows more current to flow in the armature, the time of arrival of a pulse at control element 52 effectively determines the speed of the motor. The earlier in the cycle the pulse arrives, the longer SCR 20 conducts, and the more speed and more torque the motor is able to produce.

Referring now to the circuitry represented generally by numeral 22, the pulse timing network consists of capacitor 54, breakdown diode 56, and pulse transformer 58, the resistance network having a common junction at 60 with filter capacitor 61 and the capacaitor groundreturn circuit consisting of transistor 62 and its biasing circuitry. As the D.C. cycle beings, a current starts to flow through the voltage dividing network consisting of resistors 64 and 66 and potentiometer 68. As the cycle proceeds, the potential present at point 60 increases to a level determined by the ratio of resistor 64 to the resistance presented by the resistor 66 and potentiometer 68 and the circuitry connected thereto. In a typical application, the voltage at point 60 will be about fifty volts. If the negative side 70 of capacitor 54 were grounded, then the capacitor would charge through resistor 72 to a maximum of fifty volts, the charging rate being determined by resistor 72. The breakdown diode 56 is so chosen that it will begin to conduct when the potential difference between joints 70 and 74 reaches a predetermined threshold value, in this instance somewhere between zero and fifty volts, for example, 32 volts. Thus, when the cycle has progressed to a point where the capacitor reaches a potential of 32 volts, the breakdown diode 56 begins to conduct, discharging the capacitor through pulse transformer 58. This produces a pulse on the secondary winding 76 of the pulse transformer and this pulse fires (initiates conduction in) SCR 20. This sequence, however, is contingent upon having the negative side 70 of capacitor 54 grounded, i.e. connected to point B. In the present circuit, capacitor 54 is grounded through transistor 62 which may assume various states of conductance. When transistor 62 is fully conducting, it is essentially a short, and point 70 is held above ground only by resistor 78, the resistance of which is relatively small, and thus the potential difference between points 70 and 74 is close to the voltage appearing between point 74 and ground. Under this condition, the potential difference across the breakdown diode will reach 32 volts at approximately the same time the voltage between point 74 and ground reaches 32 volts. This occurs early in the D.C. cycle. On the other hand, the transistor can be made essentially non-conducting, under which condition point 70 will be isolated from ground and there will be no potential difference between points 70 and 74, breakdown of diode 56 will not occur and the motor will not run. By adjusting the conductance of transistor 62, the point in the cyle at which the potential difference between 70 and 74 reaches 32 volts can be varied, and thus the time at which breakdown of the diode and firing of the SCR occurs can be varied, allowing complete control of the motor speed. High conduction of transistor 62 produces an early pulse and thus a high motor speed, and a lower conduction produces a later pulse and thus a lower speed.

As seen from the foregoing, the motor-speed is controlled by varying the amount of conduction of transistor 62 which will conduct when its base 80 is more positive than its emitter 82. Thus the amount of conduction can be varied by controlling the base bias or by controlling the emitter bias. In practice, control of the base bias is more effective; therefore, potentiometer 68, which varies the base bias, is used to control the motor speed. As the arm 86 of the potentiometer approaches terminal 84, the voltage on the base of transistor 62 decreases and conduction of the transistor decreases and the motor slows down. The base 80 of transistor 62 receives its base voltage through isolation resistor 88 which, in conjunction with capacitor 90, acts as a filter, to keep the pulsations in the D.C. voltage from adversely affecting the operation. In addition, the capacitor tends to prevent minor voltage fluctuations in the line from affecting the operation of the circuit. Further, by slowing the response of the system to changes, this capacitor serves to prevent abrupt changes in the potentiometer setting from causing damage to the motor.

In order to increase stability of the system and at the same time to make the speed control less critical, a regulatory closed-loop feedback network is used. This network consists of resistor 78, voltage divider resistors 94 and 96 and filter capacitor 98. As the conduction of transistor 62 increases, the pulses of D.C. current appearing in line 32 become of longer duration. Some of this voltage is bled off through line 100 to the feedback network and thence to the emitter of transistor 62. The effect of this is to reduce the level of conduction of the transistor, thus requiring a greater variation of potentiometer 68 to produce the desired change in motor speed. If this feedback circuit were not used, the entire range of settings of the potentiometer to change the motor from fully off to fully on would take place in a relatively small movement of the potentiometer arm, and it would therefore be quite difficult to obtain the desired motor speed. This feedback loop serves to broaden the range of the efficacious potentiometer settings, this feature thereby bringing about more stability in the system, because a greater variation in base bias is required to appreciably change motor speed. In addition, with the feedback system, a small fluctuation in supply voltage does not cause a significant change in motor speed. Resistors 94 and 96 drop the voltage coming from line 100 to that required by the emitter circuit. Because of the pulsating nature of the voltage coming in line 100, capacitor 98 is provided to make the operation more stable. Resistors 94 and 96 augment the filtering effect of capacitor 98.

When the motor is placed under heavy load, the armature draws more current. To prevent damage to the motor from overheating caused by an overload, another negative feedback system is utilized which acts in response to the current being drawn by the armature, and limits the current available to the armature, should overload become too great. Resistor 102 is used in series with the armature and is sufficiently small that it does not slow the motor appreciably, but is large enough to have a detectable potential difference across it. This potential difference is directly proportional to the current drawn by the armature and thus can be used for the current-limiting function. The D.C. voltage appearing across resistor 102 is sensed by transistor 103 through resistors 104 and 108. As the voltage on the base 110 of transistor 103 increases, conduction through said transistor will become greater, bypassing potentiometer 68 and thus lowering the voltage on the base of transistor 62. This causes transistor 62 to conduct less, thereby causing SCR 20 to conduct for a shorter period of time, thus reducing the current flowing in armature 18 to a safe level. Capacitor 106, in combination with resistors 104 and 108, filters the D.C. current from line 34.

Generally, the circuit has been described in its operation during an individual cycle of the pulsating D.C. current. In order for the circuit to continue to operate from one cycle to the next, a reset diode 112 is provided which allows any residual current being stored in the circuit containing capacitor 54, pulse transformer 58, and breakdown diode 56 to return to point A when the voltage at that point reaches zero, thus allowing the circuit to be re-energized on the next cycle.

When the circuit is first energized, ordinarily the full output of SCR 20, as determined by the speed control potentiometer 68, would appear at the armature, causing a large inrush of current to the motor. Since this inrush might damage the motor and machinery to which it is connected, a means of starting the motor more slowly is desirable. This action is obtained by means of capacitor 90. When current first appears at point 80, capacitor 90 begins to charge. This reduces the amount of current available for turning on transistor 62, hence the threshold voltage of the breakdown diode is not reached until late in the cycle. Thus, SCR 20 conducts for only a short time, and armature 18 receives only a small amount of current, causing the motor to start slowly. But as capacitor 90 continues to charge and more current is made available to the transistor 62, firing of the SCR occurs earlier in the cycle, and the motor increases its speed. Soon capacitor 90 is fully charged, and for all practical purposes, it is no longer in the circuit. At this time, speed control 68 is the only element which produces changes in the speed of the motor, thus achieving a timed starting ramp.

In the operation of the circuit, output from the rectifier bridge 16 directly excites the field winding of the controlled motor, and energizes the armature winding through the silicon controlled rectifier 20. The silicon controlled rectifier, by determining the portion of the D.C. cycle during which current is allowed to reach the armature, determines the operating speed of the motor. As the D.C. cycle progresses, timing capacitor 54 charges until the potential across it reaches a predetermined level, at which time breakdown diode 56 begins to conduct. When this occurs, a sharp D.C. pulse is transmitted to the secondary winding 76 of pulse transformer 58, and this pulse triggers the silicon controlled rectifier. Thus, speed of the motor is determined by how soon the potential difference across the capacitor reaches the breakdown potential of the diode 56. The point at which the charge reaches this threshold value is determined by the state of conduction of transistor 62, which acts as a ground return for the capacitor. The higher the state of conduction of transistor 62, the closer the negative end 70 of capacitor 54 is to ground potential, and therefore the sooner in the cycle the diode breakdown voltage is reached, resulting in an increase in motor speed.

The state of conduction of the transistor 62 is determined primarily by the amount of bias appearing on its base. Thus, potentiometer 68 acts effectively as the motor speed control. When the operator of the machine desires to increase the motor speed, the arm 86 of the potentiometer is moved to a position farther from the ground lead 84. This increases conduction through transistor 62, thus allowing the breakdown of diode 56 to occur earlier in the D.C. cycle, and the silicon controlled rectifier is therefore triggered earlier in the cycle, it conducts for a longer period of time, and the speed of the motor increases. Likewise, moving the potentiometer setting closer to ground will reduce conduction in the transistor, and hence the voltage across capacitor 54 will not be great enough to achieve breakdown until later in the cycle, and the SCR will not be triggered until later in the cycle, thus decreasing the speed of the motor.

While the SCR has been shown connected to the positive end of the full-wave rectifier, the circuit can operate with the SCR connected to the negative end with no significant changes in the circuit.

We claim:

1. In a power supply system for a D.C. motor having as its source an A.C. current: a full-wave rectifier having a first line and a second line, one line carrying a positive potential and the other line carrying a negative potential, a line connectig said first line of the rectifier to a motor, a silicon controlled rectifier in said line, a solid state triggering circuit for said silicon controlled rectifier including a capacitor, a breakdown diode and a pulse transformer in series connected to the control element of said silicon controlled rectifier, a variable means for controlling the charge across said capacitor, and a reset diode connected to said capacitor and to said line between said full-wave rectifier and said silicon controlled rectifier for returning the charge on said capacitor to the initial condition after each conducting period of said silicon controlled rectifier.

2. A power supply system as defined in claim 1 in which said variable means for controlling the charge across said capacitor contains a transistor and biasing means for said transistor.

3. A power supply system as defined in claim 2 in which said transistor is connected to the line joining said capacitor to said pulse transformer and to the second line of said full-wave rectifier.

4. A power supply system as defined in claim 3 in which a means for providing a fixed bias to said transistor is connected between the emitter of said transistor and said second line of said full-wave rectifier.

5. A power supply system as defined in claim 2 in which said biasing means includes a source of variable voltage connected to the base of said transistor.

6. A power supply system as defined in claim 5 in which said variable voltage source consists of a voltage divider network connected between said first and second lines of said full-wave rectifier, and containing a potentiometer and a line connecting the arm of said potentiometer to the base of said transistor.

7. A power supply system as defined in claim 6 in which said biasing means contains a means for changing the bias in response to a condition of motor overload.

8. A power supply system as defined in claim 7 in which said overload responsive means contains a second transistor connected across said potentiometer, and a line connecting the base of said second transistor to a resistor, said resistor being connected between the armature of said motor and said second line of said full-wave rectifier.

9. A power supply system as defined in claim 4 in which a feedback line is connected to said first line between said silicon controlled rectifier and the motor, and to the second line of said full-wave rectifier and a voltage divider network contained in said feedback line.

10. A power supply system as defined in claim 6 in which a capacitor is connected to a point in said voltage divider network and to said full-wave rectifier.

References Cited
UNITED STATES PATENTS 3,177,418    4/1965    Meng.
3,327,195    6/1967    Mason _____ 318—345 XR ORIS L. RADER, Primary Examiner
ROBERT J. HICKEY, Assistant Examiner U.S. Cl. X.R.
318—434; 323—4, 9